United States Patent [19]
Cortese

[11] Patent Number: 5,138,633
[45] Date of Patent: Aug. 11, 1992

[54] METHOD AND APPARATUS FOR ADAPTIVELY RETIMING AND REGENERATING DIGITAL PULSE SIGNALS

[75] Inventor: John A. Cortese, Reading, Mass.

[73] Assignee: AT&T Bell Laboratories, Murray Hill, N.J.

[21] Appl. No.: 615,934

[22] Filed: Nov. 19, 1990

[51] Int. Cl.$^5$ .............................................. H04L 7/027
[52] U.S. Cl. ................................. 375/106; 307/602; 307/603; 375/118
[58] Field of Search ............... 375/106, 111, 118, 119; 307/352, 353, 600, 602, 603; 328/56, 151, 155

[56] References Cited

U.S. PATENT DOCUMENTS

| | | | |
|---|---|---|---|
| 3,755,736 | 8/1973 | Kaneko et al. | 375/118 |
| 3,911,368 | 10/1975 | Tarczy-Hornoch | 307/602 |
| 3,986,126 | 10/1976 | Gindi et al. | 375/106 |
| 4,245,345 | 1/1981 | Gitlin et al. | 375/13 |
| 4,618,787 | 10/1986 | Jacksier et al. | 307/603 |
| 4,715,049 | 12/1987 | Andrews et al. | 375/106 |

Primary Examiner—Benedict V. Safourek
Attorney, Agent, or Firm—E. Weiss

[57] ABSTRACT

This invention is a timing recovery arrangement which adaptively retimes and regenerates a received stream of data pulse signals. The received stream of data pulse signals are selectively simultaneously sampled at two or more locations for the presence or absence of a data pulse signal. A signal representative of the detection of a pulse signal is generated for each location. The signals for the locations sampled are combined to generate a control signal which is used to selectively controllably change the locations where the samples are taken. Changing the locations where the samples are taken continues until the signal for the first location sampled is substantially equal to the signal for the second location sampled. In accordance with an embodiment of the invention, the control signals obtained, when two locations sampled, are sampled are generated by integrating the signals from the respective locations sampled to generate a first control signal and a second control signal.

15 Claims, 5 Drawing Sheets

METHOD AND APPARATUS FOR ADAPTIVELY RETIMING AND REGENERATING DIGITAL PULSE SIGNALS

TECHNICAL FIELD

This invention relates to a timing recovery network which generates a timing signal and a data signal, both having well shaped pulses, from a received data pulse signal having poorly shaped pulses.

BACKGROUND OF THE INVENTION

Timing recovery arrangements are necessary to compensate for the distorting effects of transmission channels on data pulse signals. One type of timing recovery unit presently in use comprises two subcircuits fabricated on a VLSI chip. One subcircuit is a clock recovery circuit and the other is a data pulse signal regenerating circuit; and the two subcircuits operate in parallel with each other. In operation the clock recovery circuit generates a clock pulse signal which is used to synchronize the operation of various circuits. The clock pulse signal is also used by the data regenerating circuit to mark the instant when a received data pulse signal is to be sampled.

During manufacture, it is very difficult to replicate subcircuits on many chips so that they all have identical electrical characteristics. Therefore, because of variations of the electrical characteristics of the subcircuits, each timing recovery arrangement must be tested. Frequently, manual adjustment of the timing recovery arrangement is required to provide an operable device. This testing procedure is both time-consuming and expensive. In some instances, where cost is a major factor, only those devices which meet specifications without adjustments are used.

In addition, temperature variations have an adverse effect on the operating characteristics of the two subcircuits. During the testing procedure, device performance is optimized at a single temperature. But, because performance degrades as the operating temperature in the field varies from the ideal temperature, devices are currently restricted to a relatively narrow commercial temperature range.

Clearly, an improved timing recovery arrangement is required.

SUMMARY OF THE INVENTION

This invention is a timing recovery network which adaptively retimes and regenerates a received stream of data pulse signals. Data pulse signals of the received stream are simultaneously sampled at two or more locations for the presence or absence of a data pulse signal.

At the heart of the invention is our recognition that when a stream of data pulse signals is sampled at two or more closely spaced locations, the signals from the locations sampled are similar only when each location actually samples a data pulse signal. If one location does not actually sample a data pulse signal, than the signals from the various locations are different. A control signal generated by combining the signals from the different locations sampled is used to determine the correct position for the locations sampled. In accordance with an embodiment of the invention, the control signals obtained, when two locations are sampled, are generated by integrating the signals from the respective locations sampled to generate a first control signal and a second control signal.

DETAILED DESCRIPTION

Figure 1:
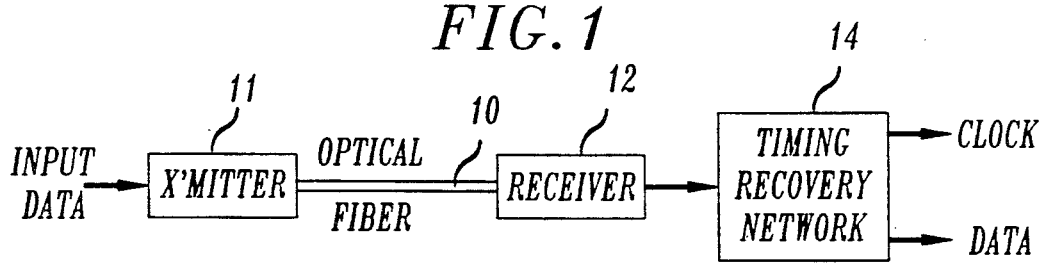
FIG. 1 illustrates a portion of an optical fiber network having a timing recovery network.

Referring to FIG. 1, there is illustrated a portion of an optical fiber network having a timing recovery network for retiming and regenerating a received stream of data pulse signals. Data in the form of optical pulse signals is carried along an optical fiber 10 from a transmitter 11 to a receiver 12, where it is converted into electrical form. The output signal from the receiver 12 is fed to a timing recovery unit 14, also referred to as a retimer for retiming and regeneration. Normally, the timing recovery unit generates two output signals. One signal is a stream of data pulse signals where each pulse has a well defined shape. The other is a clock or timing signal. The data pulse signal is a copy of the transmitted signal, where each received pulse has been reshaped. The clock signal is a series of pulse signals which are extracted from the incoming signal.

Figure 2:
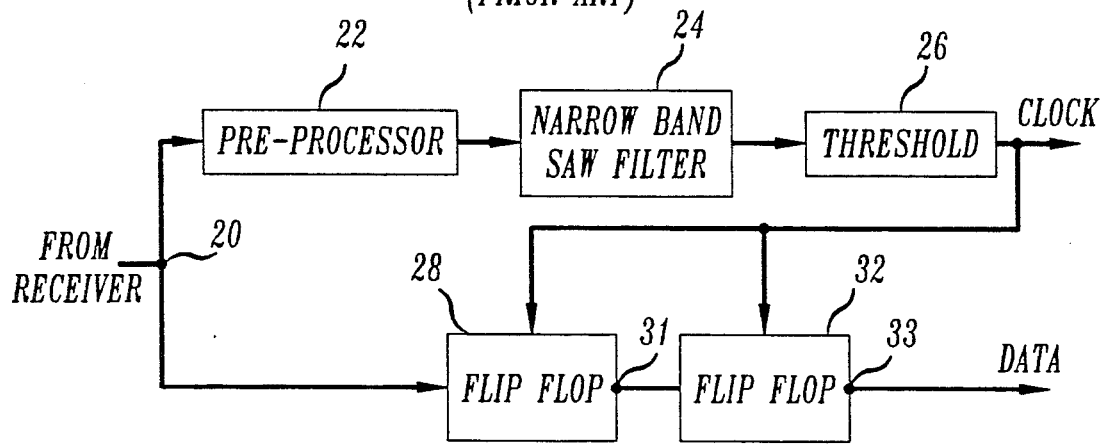
FIG. 2 is a block diagram of a typical timing recovery network for retiming and regenerating a received stream of digital pulse signals.
Figure 3:
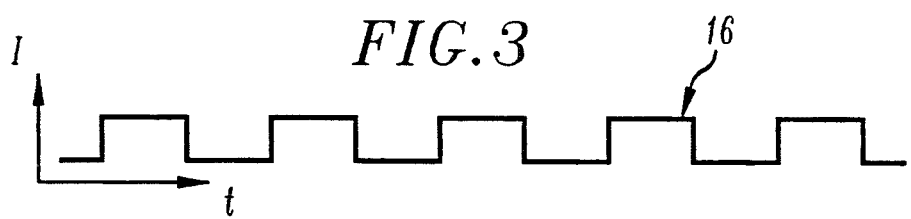
FIG. 3 is a plot of a typical optical wave shape launched onto an optical fiber where the horizontal axis represents time and the vertical axis is intensity.

Referring to FIG. 2, there is illustrated a block diagram of a prior art timing recovery network 14. The input signal to the timing recovery network is an electrical signal having the shape of the optical signal received by receiver 12. More specifically, referring to FIGS. 3 and 4, there are illustrated two waveshapes 16 and 18. Waveshape 16 is that of an optical pulse signal generated by a transmitter and launched onto an optical fiber. Waveshape 18 is typical of a data pulse signal which has traversed an optical fiber path and is received by an optical receiver. It is to be noted that the received optical signal does not consist of the sharp, well defined, data pulse signals initially transmitted. The pulse signals of the received optical signal, in addition to having noise, have rounded leading and trailing edges. Receiver 12 converts the received optical pulse signals into electrical pulse signals. Waveshape 18, which is the waveshape of the received optical pulse signal, is also the waveshape of the converted electrical pulse signal generated by receiver 12.

The electrical equivalent of waveshape 18 is fed to the timing recovery network 14. Returning to FIG. 2, an electrical signal, typically signal 18, is received at the input port 20. The purpose of the timing recovery network is twofold; the first to convert the received electrical data pulse signals into electrical data pulse signals which are well defined, and the second is to generate a clock signal which can be used to drive succeeding circuitry. The received electrical signals at input port 20 travel along the upper and lower paths. The upper path generates a clock signal from the received signal. The lower path redefines the received electrical signal into well defined data pulse signals. The top path can be identified as the clock path and the lower path can be identified as the data path. The top or clock path can comprise a preprocessor circuit 22 which typically squares the received signal to generate a narrow band signal. The preprocessor circuit can include an automatic gain control section to provide a high gain to the squared signal. The output signal of the preprocessor circuit is fed to a narrow band SAW filter 24. Filter 24 is tuned to the data rate of the signal being received to pass only a sine wave signal at the frequency of the received data. The sine wave output signal of the filter 24 is fed to a threshold circuit 26 which generates a signal of plus 5 volts when the input signal is above 2.5 volts, and a signal of zero volts when the input signal is below 2.5 volts. Thus, the signal from the threshold circuit has a range of 0 to 5 volts and is a square wave pulse signal having a frequency which is equal to that of the signal received at input port 20.

The pulse output signal from the threshold circuit 26 is received by a flip flop 28. Flip flop 28 is also coupled to receive the input signal from input port 20. In operation, flip flop 28 is triggered by the signal from the threshold circuit 26 to sample the signal from the input terminal 20. More specifically, flip flop 28 operates on a rising trigger signal. The leading edge rising potential of the signal from threshold 26 triggers flip flop 28. In operation, the trigger occurs as the rising signal from the threshold circuit 26 passes through 2.5 volts. At that instant, a sample is taken of the signal from the input terminal 20. If, at the instant the sample is taken, the signal from the input terminal is greater than 2.5 volts, then a pulse signal of 5 volts is generated at output terminal 31. If, however, at the instant the sample is taken the signal from the input terminal is less than 2.5 volts, then a signal of zero volts is generated at output terminal 31.

Thus, flip flop 28 makes a decision as to whether or not the signal from the input terminal 20 is a "one" or a "zero". It is assumed that the decision is accurate if the rising edge of the trigger-signal from the threshold circuit 26 is aligned with the optimum sample point of the pulse, which is typically, but not necessarily the center of a pulse signal from input terminal 20.

The output signal from flip flop 28 is a stream of pulse signals similar to the data pulse stream at input terminal 20. Prior to appearing at output terminal 31, the pulse stream is delayed within flip flop 28 for a predetermined interval. The delayed pulse stream from flip flop 28 is fed to a second flip flop 32, and the pulse signals from the threshold circuit 26 are also directed to flip flop 32. The leading edge of each pulse signal from the threshold circuit 26 occurs at about the time the middle of the pulse signal from flip flop 28 arrives at flip flop 32. If coincidence occurs, that being the occurrence of a pulse signal from flip flop 28 during the occurrence of the rising leading edge of a pulse signal from threshold circuit 26, then the signal from flip flop 28 acts as the trigger to pass the pulse signal from threshold circuit 26 to the output terminal 33 of flip flop 32. This signal now becomes the regenerated data pulse stream signal. Additionally, the signal from the threshold circuit 26 is coupled to an output terminal to become the digital clock signal.

A major problem with the prior art circuit of FIG. 2 is generating a clock pulse signal at the output of threshold circuit 26 which is aligned with the data pulse signals received at terminal 20. More specifically, the rising leading edge of the pulse signals from the threshold circuit 26 must arrive at the flip flop 28 at the same time that the peak of a pulse, usually the center of a pulse of the data pulse stream arrives at the flip flop. Presently, to obtain this concurrence, each timing recovery unit must be individually tested and adjusted, a procedure which is very expensive.

Figure 5:
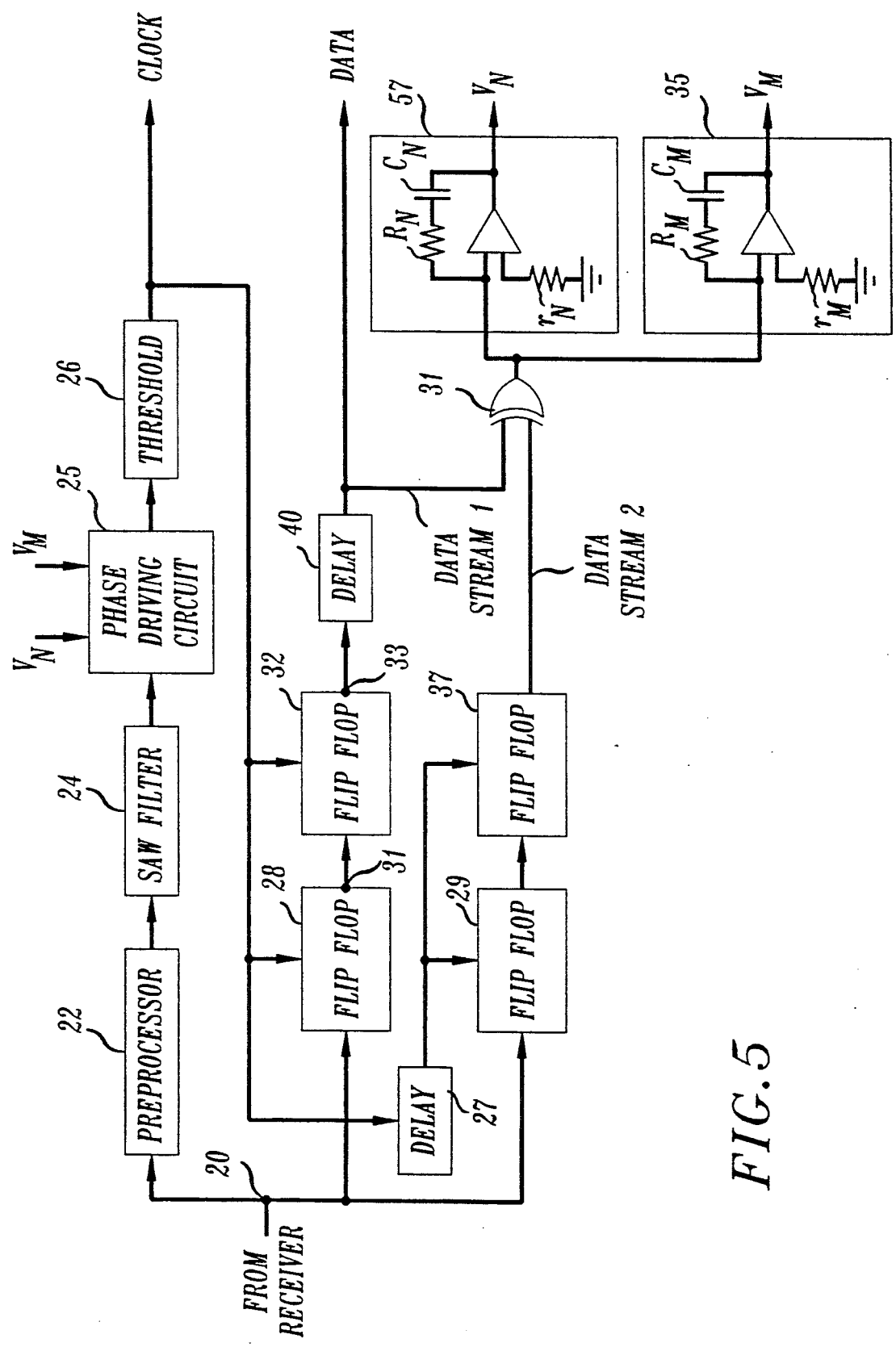
FIG. 5 is a block diagram of an embodiment of a timing recovery network in accordance with the principles of the invention.

Referring to FIG. 5, there is illustrated a block diagram of a timing recovery network in accordance with the principles of the invention which adaptively retimes and regenerates a received stream of data pulse signals. The various elements of FIG. 5 which are similar to the various parts of FIG. 2 have similar reference numbers. The new improved timing recovery network of FIG. 5 is self-adjusting and, therefore, does not require the expensive testing procedure which is required for the prior art timing recovery devices.

To provide a more complete understanding of the invention, an explanation of the concept of the invention will first be presented, and then a description of structure for practicing the invention will be provided.

Figure 4:
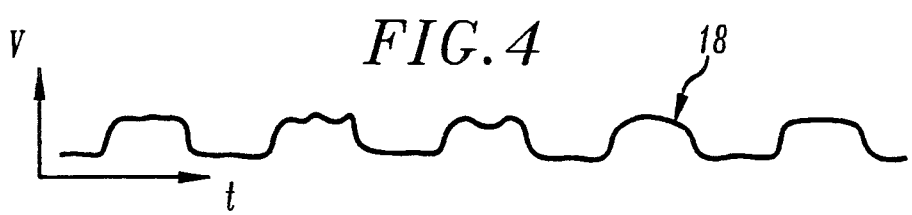
FIG. 4 is a plot of the optical wave shape received by the receiver, and of the electrical wave shape generated by the receiver where the horizontal axis is time and the vertical axis is voltage.

Referring to FIG. 4, the leading and trailing edges of each of the various data pulse signals, after they have traversed an optical fiber path, do not normally occur at the same instant of time relative to the generated clock pulse signal. For example, as the signal to noise ratio in optical transmission systems decreases, a substantial fraction of low to high transitions at the beginning of each pulse of FIG. 4 moves toward the right. Similarly, a substantial fraction of high to low transitions at the end of each pulse of FIG. 4 moves toward the left. Thus, as the signal to noise ratio in an optical system decreases, the pulses become smaller. If, relative to time, the various pulses are compared to each other, it will be seen that while they may start and end at different times, they all have a common region. A diagram of the various pulses superimposed upon each other is normally referred to as the eye diagram where the common region is referred to as the region of clear and the region where the pulses start and end are referred to as the region of transitions. The optimum place for sampling a pulse signal is in the region of clear 42. The inventive timing recovery network here disclosed automatically locates and samples this area.

Figure 6:
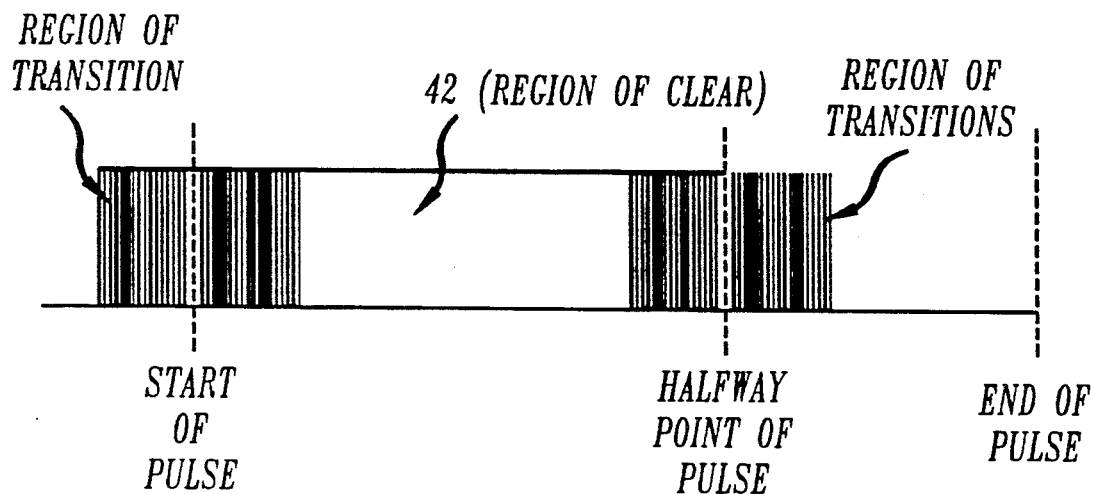
FIG. 6 is an illustration of a typical eye diagram of the signal of FIG. 4.
Figure 7:
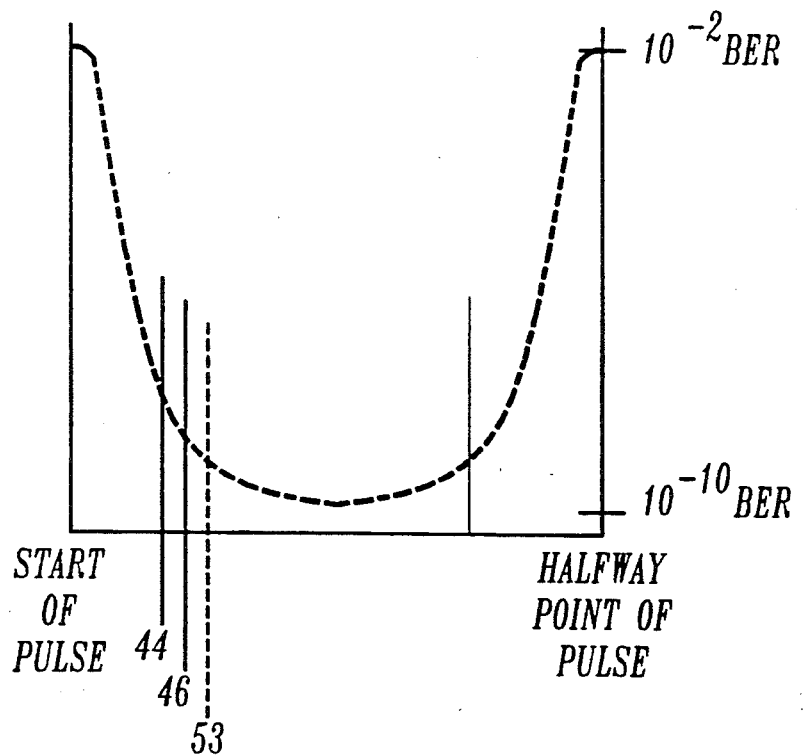
FIG. 7 is a plot of the bit error rate of the eye diagram of FIG. 6.

Referring now to FIG. 7, there is a plot of the Bit Error Rate (BER) of the eye diagram of FIG. 6. A $10^{-2}$ BER means that one bit in $10^2$ (or 100) bits is not correctly decoded. Similarly, $10^{-10}$ BER means that one bit in $10^{10}$ bits is not correctly decoded.

To determine the presence or absence of a pulse in a data stream, the data stream is sampled at at least two locations simultaneously. The detection of a signal greater than i.e., 2.5 volts represents the detection of a pulse and the detection of signal less than, i.e., 2.5 volts represents the detection of no pulse. Now, referring to FIG. 7, if a pulse is sampled at two locations such as location 44 and 46, then a signal representative of the detection of a pulse signal is generated at each location. The signals from the locations sampled are combined to generate a control signal which is used to move sample locations 44, 46 to the left or right of FIG. 7. The locations sampled are moved, for example, in FIG. 7, to the right until the signal for the first location sampled is substantially equal to the signal for the second location sampled. When this occurs, the pulses of the stream of pulse signals are being sampled in the region of clear, not in the region of transition.

In a physical manifestation of the inventive concept, if it is assumed that the data bit stream is sampled at locations 44, 46 (FIG. 7), where the locations 44, 46 are in the eye, and that a clock signal is generated at each instant that a sample is taken, then two output data streams, Data Stream 1 for location 44 and Data Stream 2 for location 46 will be obtained. An Exclusive Or gate will generate a pulse signal when the two input pulse signals are different. That is, there is a pulse signal on one input port and the absence of a pulse signal on the other input port. Now, if sample points 44 and 46 are near the beginning of the eye, then Data Stream 1 may have a BER of $10^{-2}$ and Data Stream 2, being nearer to the center of the eye then Data Stream 1, may have a BER of $10^{-3}$. If the two data streams are applied to separate input terminals of an Exclusive Or gate, the output signal of the Exclusive Or gate will generate a pulse signal each instant that the pulse signals on the input ports are different. Now, if the two sample points 44, 46 are moved toward the right, the number of pulses generated from the Exclusive Or gate will decrease because the number of pulses in Data Stream 1 will approach the number of pulses in Data Stream 2. If the output signal of the Exclusive Or gate is fed to a running average circuit such as, for example, a leaky integrating operational amplifier, a voltage will be obtained from that leaky integrating operational amplifier which is a measure of where, within the eye diagram, the sample points 44, 46 lie. When the voltage from the leaky integrating operational amplifier is high, sample points 44, 46 are near to the start of a pulse or the half way position of a pulse. When the voltage from the leaky integrating operational amplifier is low, i.e., substantially near 0 volts, the sample points 44, 46 are near center of the pulse. It is to be noted that it is the center of a pulse which is the bottom of the BER curve which is the optimum place for sampling. Thus, to find the optimum sample location, the sample points should be moved until the signal from the integrating operational amplifier is minimum.

Various circuit arrangements can be used to determine when the voltage from the leaky integrating operational amplifier is minimum. One such arrangement is to slowly drive the sample points through the eye while the voltage from the leaky integrating operational amplifier is determined. When the voltage starts to increase, the sample points are near the bottom of the BER curve and movement of the sample points should be stopped.

Referring to FIG. 5, there is illustrated a block diagram of an embodiment of a timing recovery network, in accordance with the principles of the invention for sampling pulses of a stream of data pulse signals at two different locations. The two sample locations are set to be relatively close to each other and can be moved relative to the pulses of a received data pulse signal. When the two locations are centered in the middle of the pulses, each location is decoding with the same accuracy. Structurally, a phase driving circuit 25 is positioned between the narrow band SAW filter 24 and the threshold circuit 26. The output clock signal from the threshold circuit 26 is delayed in a delay circuit 27 before being fed to an input port of flip flop 29 and flip flop 37. The input signal applied to input port 20 is coupled to a second input port of flip flop 29. The output signal of flip flop 29 is applied to an input port of flip flop 37 and the output signal of flip flop 37 is fed an input port of an Exclusive Or gate 31. The data signal from flip flop 32 is applied through a delay circuit 40 to a second input port of gate 31. The output port of Exclusive Or 31 is coupled to a first running average circuit 57 such as a leaky integrating operational amplifier and to a second running average circuit 35 such as a leaky integrating operational amplifier. The first running average circuit 57 is designed to generate a voltage which is a measure of the error difference over M data pulses and the second running average circuit 35 is designed to generate a voltage which is a measure of the error difference over N data pulses where $N>>M$. For example, typically, N may be equal to $10^7$ data pulses and M can be equal to $10^5$ data pulses. The output signals of the first and second running average circuits 57 and 35 are directed to two input ports of the phase driving circuit 25.

In operation, a stream of data pulse signals are received at input port 20 and advance to preprocessor circuit 22, flip flop 28, and flip flop 29. The preprocessor circuit 22 performs two functions. First, it passes the incoming signal through a non-linear operation, such as a squaring filter, which squares the received signal. The signal is squared to concentrate the energy of the received signal into the narrowband of the SAW filter 24. Because of the non-linear operation of the squaring filter, the signal to noise ratio at the baud rate of the signal (e.g., 200 MHz if the signal received is 200M bits/sec) going into the saw filter 24 is now acceptable for extraction using the filter. As noted above, the second function performed by the pre-processor circuit 22 is to amplify the received signal and to match the impedance of the preprocessor circuit 22 to the input impedance of the SAW filter 24. Thus, the pre-processor circuit 22 basically matches the incoming data signal to the SAW filter to maximize the signal-to-noise ratio at the output of the SAW filter.

The SAW filter can comprise a piezoelectric device which creates a very narrowband filter at high frequencies. In one embodiment, the SAW filter transforms electrical energy into acoustical energy and directs this acoustic energy into a waveguide at the crystal surface. A receiving transducer which "listens" at the end of the acoustic waveguide picks up only that energy which lies in a specific frequency band. Ideally, the output of the SAW filter is a sine wave signal having a frequency which is equal to the baud rate (e.g., 200 MHz). The SAW filter generates two output signals which are ninety degrees apart in phase.

The phase or driving circuit 25 receives the two output signals from the SAW filter and combines them to form a vector which rotates, in phase, where the phase drift rate is determined by the value of the input signals $V_N$ and $V_M$. The output signal of the phase driving circuit 25 is fed to threshold circuit 26 which generates a pulse signal of zero volts when the received signal is 2.5 volts or less, and a pulse signal of 5.0 volts when the received signal is above 2.5 volts.

The clock signal from the threshold circuit 26 is a stream of uniformly spaced alternately positioned pulse signals of 5.0 volts and 0.0 volts. The clock signals are directed to two flip flops 28, 32. Flip flop 28 also receives the input signal applied to port 20, and flip flop 32 receives the output signal from flip flop 28.

Flip flop 28 is a rising edge triggered flip flop. As the leading edge of the clock signal from the threshold circuit 26 rises, it triggers the flip flop input port coupled to port 20. If the potential from the input port 20 is above 2.5 volts, flip flop 28 generates a 5 volt signal at output port 31. If the input voltage is below 2.5 volts, flip flop 28 generates a signal of 0.0 volts. Thus, flip flop 28 makes the decision as to whether the received data signal is a "1" or a "0". The output signal of flip flop 28 is fed to flip flop 32. On the next rising edge clock pulse signal from threshold 26, the pulse signal from threshold 26 appears at output terminal 33 and is in phase with the clock pulse signal if a pulse signal is present at the output port of flip flop 32 from flip flop 28. This signal is the clean data output signal.

Continuing with FIG. 5, the clock pulse signal from the threshold circuit 26 is delayed by a delay circuit 27 and is then applied to flip flop 29 and flip flop 37. Delay circuit 27 delays the rising edge of the clock signal for approximately 5°-10° of phase. This delay can be implemented with a straight delay line which operates over a range of frequencies of approximately 100 MHz to 200 MHz to yield a phase delay of 10° to 5° respectively. This delay of the clock pulse signal results in the pulses of the data pulse stream being sampled at slightly different locations. Thus, by delaying the clock signal by 5°-10°, the second sample point occurs 5°-10° after the occurrence of the first sample point.

At this instant two output retimed data streams Data Stream 1 and Data Stream 2 have been generated. Data Stream 1 is from sample location 44 and Data Stream 2 is from sample location 46. The two Data Streams are directed to the two input ports of Exclusive Or gate 31. It is here noted that a delay circuit 40 having the same delay as delay network 27 is positioned between output port 33 and the Exclusive Or gate 31. Delay circuit 40 enables the two Data Streams to be aligned at the input ports of the Exclusive Or gate 31.

The output signal of the Exclusive Or gate 31 is non-zero only when the pulse signals on the two input ports are different. The output signal of Exclusive Or gate 31 is fed to a first leaky integrating operational amplifier 57, and to a second leaky integrating operational amplifier 35.

The values of the discrete components, the resistors and the capacitors $R_N C_{NT_N}, R_M C_M$ and $r_M$ determines the value of the voltages generated by the first and second leaky integrating operational amplifiers 57 and 35. By changing the values of the resistors and the capacitors, the rate at which the output voltages of the leaky integrating operational amplifiers changes relative to time for a fixed input signal can be selected.

Figure 8:
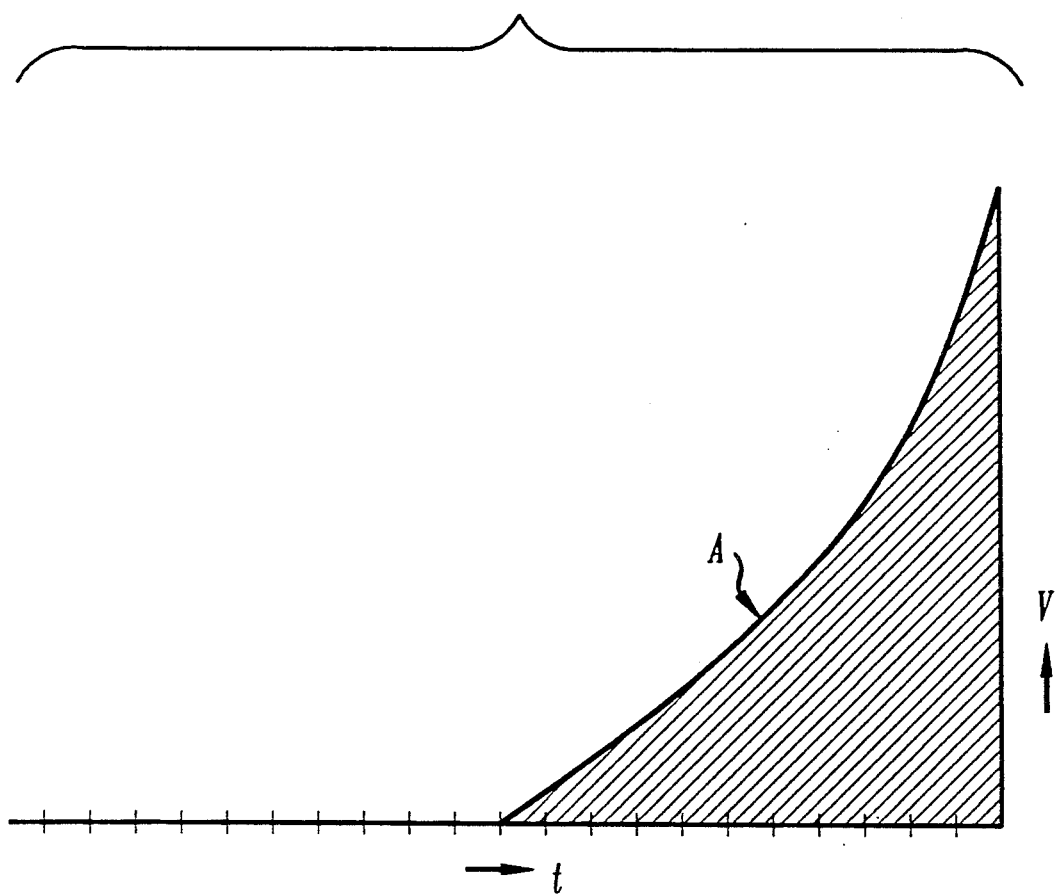
FIG. 8 is a plot of the output signal of two different leaky integrating operational amplifiers used in FIG. 5.
Figure 8:
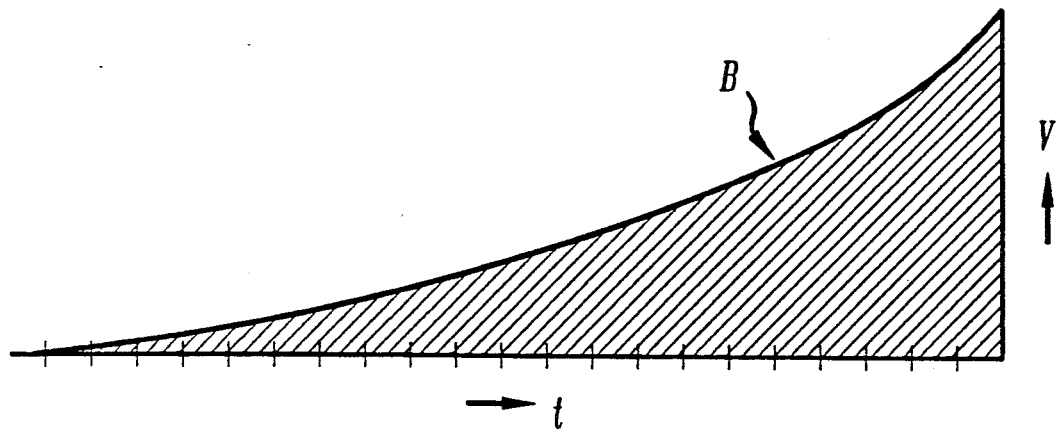

Referring to FIG. 8, there is illustrated the output signal of two different leaky integrating operational amplifiers which have different operating characteristics. Curve A can be a plot of the signal from leaky integrating operational amplifier 57 and plot B is that of leaky integrating operational amplifier 35.

The amplifiers 57 and 58 are designed such that the area of the shaded region of curve A is equal to the area of the shaded region of curve B. Therefore, as plot A has a more rapid rate of change than plot B, the height of curve A is greater than that of curve B. Now, it is assumed that curve A will falls to zero at a (time) equal to $10^5$ pulse signals and that curve B will fall to zero at a time which is equal to $10^7$ pulse signals. If the Exclusive Or gate generates an error pulse signal for each 100 incoming data pulse signals, then, because the areas under the curves are the same, the signal generated by leaky integrating operational amplifier 57 will be greater than the signal generated by leaky integrating operational amplifier 35.

This condition occurs because the short term memory leaky integrator operational amplifier does not look as far into the past as the long term memory leaky integrator operational amplifier and gives more weight to the recently received error pulses it does receive more than does the long term memory leaky integrator. Since the areas of curves A and B are equal, the voltage of curve A will be greater than that of curve B when the pulse rate of the signal from the Exclusive Or gate starts to increase. An increase in the pulse rate can be defined as going from 1 error pulse in 100 for the previous 10 million pulses to, say, 1 error pulse in 10 for the previous 100,000.

If the sample points remain in fixed position, the error pulse rate will remain constant. But, if the test points move, for example, to the left in FIG. 7, the error rate differential between the two points will increase and the rate of occurrence of error pulse signals will increase. If, however, the two points 44, 46 move toward the right until they are both at the relatively flat portion of the curve, then the rate of occurrence of pulse signals will decrease and stay at that low rate until the two points start to move into the rising halfway portion of the curve. Now, as the error pulse rate starts to increase, the voltage of the short term memory leaky integrator will be greater than the voltage of the long memory leaky integrator. In a similar manner, when the error pulse rate starts to decrease, the voltage of the short term memory leaky integrator will be less than voltage of the long term memory leaky integrator. Thus, two sample points can be used to locate the bottom of the BER curve, which corresponds to the clear region 42 of the eye diagram of FIG. 6 by driving the two test points slowly to the right or left until the potential from the short term memory leaky integrator is substantially equal to the potential from the long term memory leaky integrator.

Thus, using the principles of this invention, two sample points can be used to adaptively retime and regenerate a received data pulse signal. It is to be noted, however, that the use of two sample points does not provide an immediate positive indication of which direction the sample points should be moved to locate the optimum sampling location. But, the use of a third sample point will provide a positive indication of which direction the sample points should be moved to locate the optimum sampling location.

Figure 9:
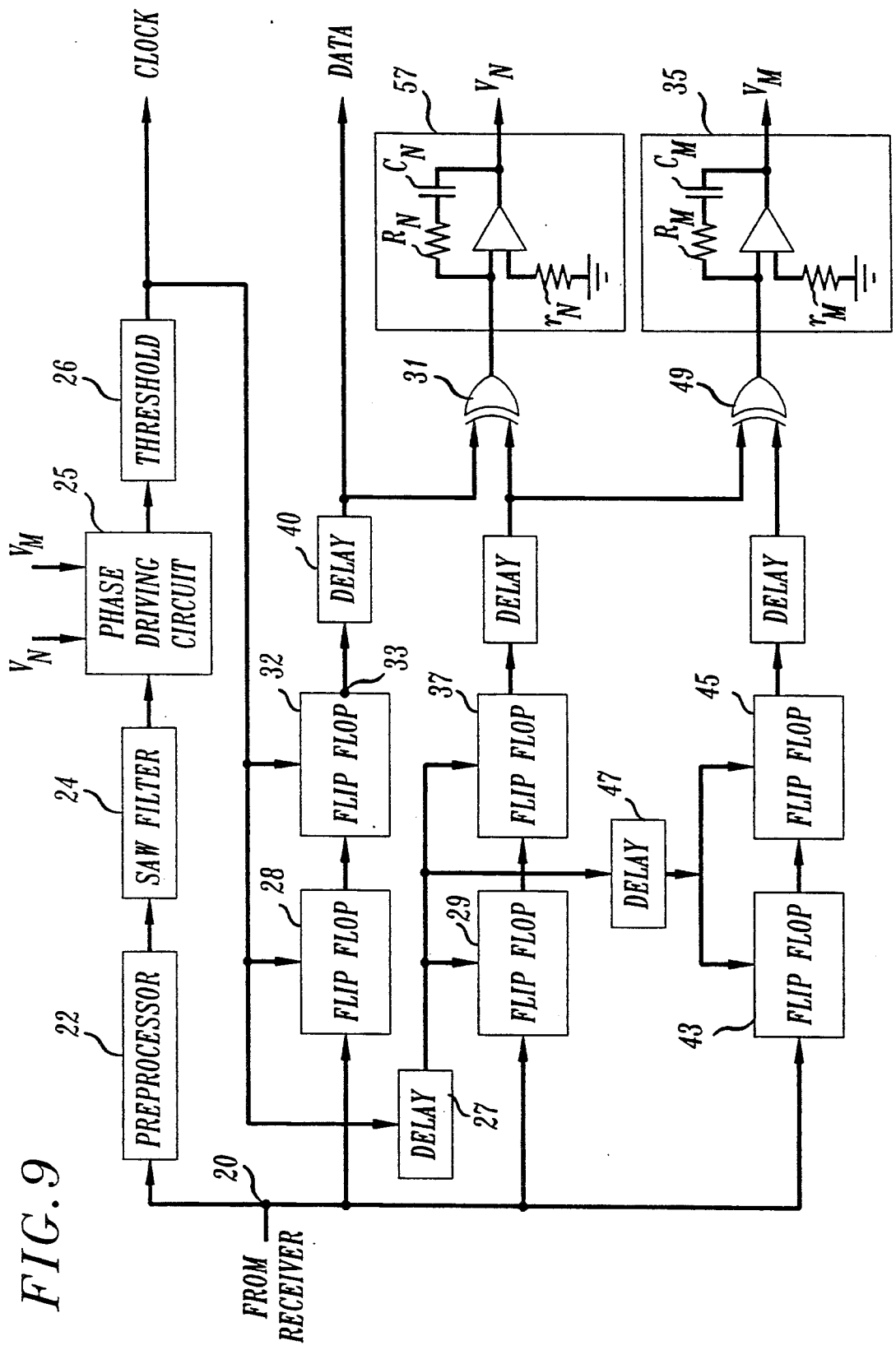
FIG. 9 is a block diagram of another embodiment of a timing recovery network in accordance with the principles of the invention.

FIG. 9 illustrates structure in accordance with the principles of the invention for generating three sample points for adaptively retiming a received digital pulse signal. The structure illustrated in FIG. 9 utilizes the structure of FIG. 5 in addition to structure for determining a third sample point and structure for generating the control signals for selectively orienting the three sample points. Referring to FIG. 9, the various parts which are common with parts of FIG. 5 have similar reference numerals. Referring to FIG. 9, flip flops 28, 32, and flip flops 29, 37 in combination with Exclusive Or gate 31 and leaky integrating operational amplifiers 57, 35 generate two sample points for adaptively retiming a received digital pulse signal. In combination with this structure, a third set of flip flops 43, 45 are included for generating a third sample point. More specifically, two flip flops 43, 45 coupled in series are positioned between input port 20 and Exclusive Or gate 49. A delay network 47 is coupled to further delay the signal from delay network 27 and to feed this signal to flip flops 43, 45. Exclusive Or gate 49 is coupled to receive at one input port an input signal from flip flop 37 and, at the other port, an input signal from flip flop 45. The output terminal of Exclusive Or gate 49 is coupled to leaky integrating operational amplifier 35 which generates control signal $V_M$. The flip flops 43, 45 in combination with delay 47 operate to sample a third sample point in the manner that flip flops 29, 37 in combination with delay 27 functions to sample a second sample point.

An advantage of the method and/or apparatus of generating three sample points is that the sample points are selectively advanced and/or retarded relative to a received pulse signal to adaptively retime a received digital pulse signal. In FIG. 9, the leaky integrating operational amplifiers 35, 57 can have resistors and capacitors R, C, r which have identical values.

In operation, the structure of FIG. 5 drives the two sample points in only one direction until the signal $V_M$ became equal to or larger than $V_N$. The structure of FIG. 5 does not selectively advance and then retard the movement of the sample points relative to a received digital pulse signal.

In FIG. 9, which discloses a three sample point adaptive timing scheme, the three sample points can be selectively advanced and/or retarded relative to a received digital pulse signal to adaptively retime a received digital pulse signal. Continuing, the value of the signal $V_N$ relative to that of $V_M$ determines the direction that the sample points are moved relative to the received digital pulse signal. When the signal $V_M$ is greater than the signal $V_N$ the sample points are selectively advanced relative to the received digital pulse signal; and, when the signal $V_M$ is less than the signal $V_N$, the sample points are selectively retarded relative to the received digital pulse signal. The three test points are neither advanced nor retarded when the signal $V_N$ is substantially equal to $V_M$. In operation, when $V_N$ is greater than $V_M$, the three sample points are selectively retarded and this is accomplished by increasing the delay in the SAW network. Similarly, when $V_M$ is greater than $V_N$, the three sample points are advanced and this is accomplished by decreasing the delay in the SAW network.

It will thus be appreciated that those skilled in the art will be able to devise various arrangements embodying the principles of the invention without departing from the spirit and scope of the inventive teachings.

I claim:

1. The method of recovering a clock signal from a received data signal and retiming and regenerating said received data signal, said method comprising the steps of generating a clock pulse signal of a first fixed potential when said received data signal is greater than a first potential and generating a second fixed potential when said received data signal is less than said first potential, sampling the received data signal with said clock pulse signal to generate a first data stream of first pulse signals when the received data signal is greater than a first potential and second pulse signals when said received data signal is less than said first potential, delaying said generated clock pulse signal, and sampling the received data signal with said delayed clock pulse signal to generate a second data stream of third pulse signals when said clock pulse signal is greater than a first potential and fourth pulse signals when said clock pulse signal is less than the first potential, comparing said first generated data stream with said second generated data stream to generate an error signal, and using said error signal to vary the phase of the generated clock pulse signal.

2. The method of claim 1 comprising the steps of comparing said first generated data stream with said second generated data stream over a period of M data pulses to generate a first error signal, again comparing said first generated data stream with said second generated data stream over a period of N data pulses to generate a second error signal, and using said first and second error signals to vary the phase of the generated clock pulse signal.

3. The method of claim 2 where N is greater than M.

4. The method of claim 2 wherein the step of generating a clock pulse signal comprises shaping the received data signal into a square wave signal, changing the square wave signal into a sine wave signal having a frequency of the received data signal, and generating a signal of a first fixed potential when said sine wave signal is greater than a first potential and a second fixed potential when said sine wave signal is less than a second potential, where said first potential is greater than said second potential, said signal being a clock pulse signal having a frequency which is equal to that of the received data signal.

5. The method of claim 4 wherein said generated clock pulse signal is a signal of square wave pulses.

6. The method of claim 1 comprising the step of delaying the first data stream generated prior to being compared with said second generated data stream.

7. The method of claim 6 wherein the delay of the first data stream generated is substantially equal to the delay of the generated clock pulse signal.

8. The method of claim 7 further comprising the step of comparing said first generated data stream with said second generated data stream over a period of M data pulses to generate a first error signal, again comparing said first generated data stream with said second generated data stream over a period of N data pulses to generate a second error signal, the period of N data pulses being greater than the period of M data pulses, and using the first and second error signals to vary the phase of the generated clock pulse signal.

9. The method of claim 8 comprising the step of delaying said generated clock pulse signal by not less than 5 degrees or more than 10 degrees.

10. A timing recovery arrangement for generating a clock signal at a clock output port and a regenerated stream of data pulse signals at a data output port from a received stream of data pulse signals applied to an input port comprising
- a clock path having a preprocessor coupled to square the pulse signals of the received stream of data pulse signals, a filter coupled to convert the squared signals from said preprocessor to a sine wave signal at the frequency of the received stream of data pulse signals, a threshold circuit coupled to generate a first pulse signal when the signal from the filter is greater than a fixed value and a second pulse signal when the signal from the filter is less than a fixed value, and a phase driving circuit located between said preprocessor and said threshold circuit to vary the phase of the signal to said threshold circuit,
- a first data path having a first flip flop coupled to a second flip flop to sample the received stream of data pulse signals at a first time for the occurrence of a pulse to generate a first stream of data pulse signals,
- a second data path having a third flip flop coupled to a fourth flip flop to sample the received stream of data pulse signals at a second time for the occurrence of a pulse to generate a second stream of data pulse signals, and
- error generating means coupled to generate an error signal from said first and second streams of data pulse signals and to feed said error signal to said phase driving circuit.

11. The timing recovery arrangement of claim 10 wherein the time spacing between said first and second sampling of said received stream of data pulse signals is substantially one-half of a degree or more.

12. The timing recovery arrangement of claim 10 wherein the time spacing between said first and second sampling of said received stream of data pulse signals is more than one-half of a degree and less than fifteen degrees.

13. The timing recovery arrangement of claim 10 wherein said error generating means comprises a gate coupled to a first leaky integrating operational amplifier and a second leaky integrating operational amplifier.

14. The timing recovery arrangement of claim 13 wherein said first leaky integrating operational amplifier has operating characteristics which are different than those of said second leaky integrating operational amplifier.

15. The timing recovery arrangement of claim 10 further comprising
- a third data path having a fifth flip flop coupled to a sixth flip flop to sample the received stream of data pulse signals at a third time for the occurrence of a pulse to generate and direct to said error generating means a third stream of data pulse signals and

* * * * *